Patented Aug. 3, 1937

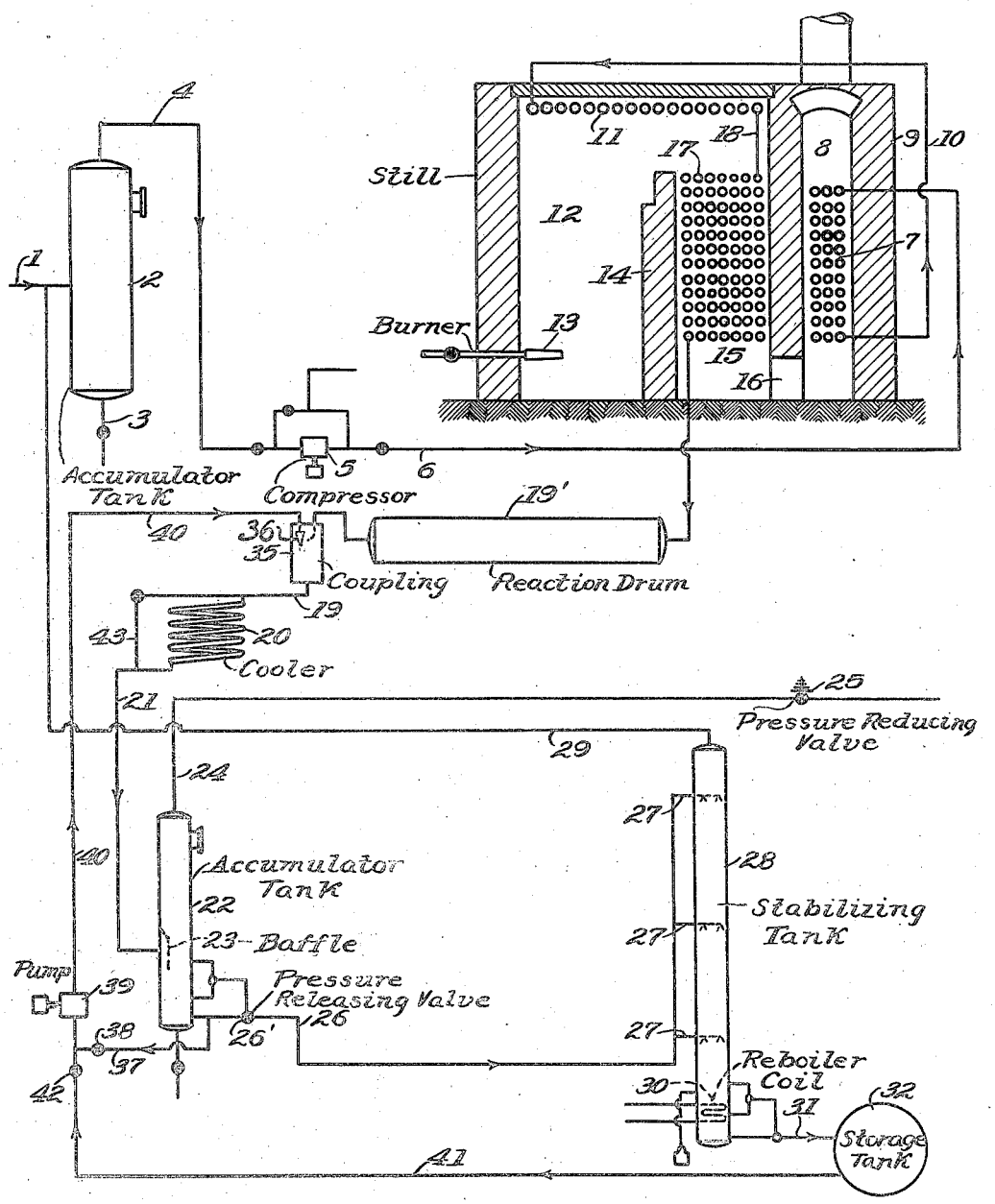

2,088,886

UNITED STATES PATENT OFFICE 2,088,886

POLYMERIZATION OF HYDROCARBON GASES

Cary R. Wagner, Chicago, Ill., assignor to The Pure Oil Company, Chicago, Ill., a corporation of Ohio Application November 5, 1931, Serial No. 573,233

14 Claims. (Cl. 196—10)

This invention relates to an improved system for effecting the formation of higher boiling hydrocarbons from hydrocarbons of a relatively lower boiling range and, more particularly, the invention has to do with the treatment of fixed unsaturated hydrocarbon gases, especially those obtained from vapor phase cracking systems, whereby a large proportion of such gases are, when subjected to controlled conditions of temperature and pressure, polymerized into hydrocarbon compounds liquid at normal pressures and which fall within the boiling range of ordinary gasoline.

This invention is a continuation in part of the disclosures contained in my prior application, Serial No. 354,426.

For a further understanding of the invention, reference is to be had to the following description and the accompanying drawing wherein has been set forth in detail one of the several possible embodiments of my invention herein selected for purposes of illustration and description, although it will be understood that the invention is not to be limited to the specific disclosure but is subject to considerable variation and modification without departing from the principles of the invention as the latter has been defined in the annexed claims.

In the drawing, the figure is a diagrammatic view illustrating certain apparatus used in the operation of the present invention, the furnace constituting the polymerizing zone being shown in vertical section.

In said drawing the numeral 1 designates a pipe line leading from the recovery plant of a cracking system. As previously indicated, cracking systems, particularly the so-called vapor-phase systems, produce relatively large quantities of gas which contain valuable liquid products. This gas is therefore sent to the recovery plant where it is passed through compressors for the purpose of separating the more readily liquefiable constituents contained therein from the gaseous constituents.

The present invention involves the treatment of the liquid-free gases released from such recovery plants with the end in view of effecting polymerization of said gases and the development of other bodies of a normally liquid-like nature suitable for use as gasoline. It will be understood, however, that the present invention may be operated in connection with gases obtained from other sources than cracking plants and I contemplate the application of the invention to all such additional uses.

The line 1 leads preferably to an accumulator tank 2 having a liquid draw-off line 3 in the bottom thereof. From the top of the tank 2 a pipe line 4 leads to a compressor 5 and in the line 4 the gas may be maintained at atmospheric temperature under pressures of 125 to 150 pounds per square inch. After being subjected to the action of a compressor, the gas leaves the latter through a pipe line 6 at, for example, a temperature of 300° F. and under pressures of approximately 1000 pounds per square inch. The gas is forced by way of the pipe line 6 into a bank of preheating tubes 7 which are positioned within the stack outlet 8 of a heater or still 9.

From the preheating tube 7 the gases flow by way of the line 10 to a horizontally arranged row of tubes 11 placed in the roof of the combustion chamber 12 of the heater which tubes are subjected in particular to the radiant heat developed within the chamber 12. A burner 13 of any desired type is situated in the lower portion of the chamber 12 and a bridge wall 14 arranged transversely in the setting of the heater separates the chamber 12 from a tube chamber 15, the latter being in communication with the outlet 8 by way of the opening 16. Arranged within the tube chamber 15 is a bank of tubes 17 which communicates with the tubes 11 by means of the pipe 18. Thus the gases after leaving the compressor 5 are subjected to the heat of the still by being passed, first through the preheating tubes 7, thence through the roof tubes 11 and then through the final bank of tubes 17 and it is within the tubes 11 and 17 especially that the desired polymerization reactions take place.

The typical polymerization reaction is an exothermic one and therefore means must be provided for controlling the ultimate temperature produced by such exothermic reactions. By passing the gases within the tubes comprising the reaction sections 11 and 17 parallel to the flow of the flue gases I secure this desired result. Initially, the temperature of the hydrocarbon gases within the reaction tubes will be below the temperature of the flue or furnace gases, and there will be some slight tendency for heat to be absorbed in the first passes or tubes of the reaction zone. As the reaction progresses, however, heat will be given off in a consistently increasing quantity, and the temperature of the reacting gases will rise until their temperature is equal to or above the temperature of the furnace or flue gases surrounding the tubes. Inasmuch as a very high temperature in these reacting hydrocarbon gases is undesirable, because of the attending formation of tars and free carbon, it is highly desirable that the temperature of the reaction should not go appreciably above 1100° F. Since the flue gases in this portion of the furnace, that is to say, in the chamber 15, will be considerably below this temperature they will act as a cooling medium preventing the reaction temperature of the hydrocarbon gases from going beyond desired limits. The apparatus described therefore gives a substantially automatic control of the temperature of reaction. The products discharged from the coil 17 and from the heater proper are delivered to an enlarged reaction drum 19' located exteriorly of the heater and protected against heat loss by heavy insulation. The reactions continue within said drum without substantial loss in pressure or temperature, the temperature of the gases within the drum being of the order of from 950° F. to 1050° F. in many instances. The enlarged reaction drum provides the necessary time element in an operation of this character and permits of the securing of high yields of the desired liquefiable constituents.

The outlet of the drum 19' is in communication with a pipe line 19 which leads to a cooling coil unit 20 employed to reduce the temperature of the gases and polymerized compounds to approximately 100° F. From the cooling unit 20 the gases and liquids flow by way of a pipe line 21 to a second accumulator tank 22 which is internally baffled as at 23. The top of the tank 22 is connected with a gas outlet line 24 by which the permanent gases are removed from the system. The line 24 may be provided with a pressure reducing valve 25 and leads to a gas tank, burner, such as a burner 13, or other zone of storage or utilization. The liquids accumulate in the bottom of the tank 22 and are withdrawn by way of a pipe line 26, provided with a pressure releasing valve 26'. The end of the line 26 contains a plurality of branches 27 which enter a stabilizing tank 28 which is adapted to weather or stabilize the liquids by removing therefrom excessively volatile compounds in the form of vapors or gases, particularly propylene or butylene fractions, the latter being discharged from the top of the tank 28 by way of a pipe line 29 which leads to the pipe line 1 providing for the recirculation of such volatiles through the system and repeated treatment thereof. The bottom of the tank 28 may be provided with a re-boiler coil 30 and with a draw-off line 31 leading to a storage tank or the like 32.

In accordance with the present invention, the outlet line 19 leading from the polymerizing zone is provided with a coupling 35 through which the heated products of the polymerizing zone pass at a temperature of the order of 1000° F. prior to entry into the cooler 20. I have found that these heated polymerized products under the elevated temperatures specified tend to liberate carbon or coke in that region of the system where the temperature of the products is in excess of 600° F. Below this last named temperature, little or no carbon is liberated but above said temperature and especially during gradual cooling of the heated products appreciable carbon liberation takes place which tends to obstruct the vapor lines and interferes with the continuity of the operation. To prevent this condition, the coupling 35 is provided with a nozzle 36 through which relatively cool oil is forced under pressure in a spray like form into intimate contact with the highly heated products leaving the reaction zone, with the result that an effective interchange of heat takes place wherein the highly heated products are rapidly reduced in temperature so that the temperature thereof upon discharge from the coupling is not appreciably in excess of 600° F., and the heat of these vapors being taken up by the cooling oil. This cooling oil may be obtained from the line 26 leading from the lower end of the tank 22. For example, a pipe line 37 provided with a valve 38 may be connected with the line 26 immediately adjacent to the tank 22. The line 37 leads to the inlet side of a pump 39, and the discharge side of the pump 39 is connected with the line 40 which leads to the nozzle 36 disposed in the coupling 35. Also, if desired, the storage tank 32 may be equipped with a pipe line 41 valved as at 42, which leads to the suction side of the pump 39 in order to supply said pump with a cool oil which may be forced under pressure to the reaction arrester or shock chiller provided by the coupling 35 and the nozzle 36.

This arrangement operates to quickly lower the temperature of the products discharged from the polymerizing zone to a non-reacting fractionating temperature. The drop from the reaction to the fractionating temperature takes place substantially instantaneously in order that carbon liberation may be reduced to a minimum. The indirect type of cooler 20 may or may not be employed when the arrester 35 is used and may be by-passed by means of the valved pipe line 43. I am aware of the fact that shock chilling has been employed in connection with cracking operations wherein high boiling oils are cracked while in the vapor phase to form lower boiling oils but so far as I am aware, this operation has not been previously applied to a gas polymerizing process to which the present invention is restricted.

The above system provides a practical and economical method and means for treating hydrocarbon gases so as to obtain therefrom maximum quantity of liquid suitable for use as gasoline. Particularly, the present invention eliminates a loss in liquid motor fuel which now normally obtains in present systems utilizing gases discharged from compressor recovery systems of oil cracking plants. In vapor-phase methods of cracking oil, cracking temperatures in excess of 1000° F. are frequently utilized. These cracking temperatures have been found to produce motor fuels having many advantageous characteristics which render the fuels peculiarly suitable for modern internal combustion engine design. However, since such cracking systems are operated at high temperatures a very large quantity of gas is produced and unless this gas is of some economic value, beyond that merely of a gaseous fuel, vapor-phase systems of cracking are handicapped economically in comparison with other types of cracking. The present invention therefore makes use of the gases obtained particularly from a vapor-phase system and by converting such gases into liquid products which may be sold as gasoline the economic value and results obtained from a vapor-phase system are correspondingly increased. In fact, I have found that by the employment of the present invention in connection with a vapor-phase cracking system the total quantity of liquid motor fuel recovered from a given amount of charging stock entering the system exceeds the normal recovery of liquid motor fuel obtained from standard types of liquid phase cracking systems. The present invention provides for a method of polymerization which functions continuously and without any appreciable carbon formation. Further, the operation of the system is substantially automatic.

What is claimed is:

1. The method of polymerizing unsaturated hydrocarbon permanent gases obtained from vapor phase cracking of hydrocarbon oils, which comprises passing such gases through a heated reaction zone of restricted cross sectional area and therein heating said gases to a temperature between approximately 800° F. and approximately 1000° F. while under a pressure of 300 to 1000 pounds per square inch to produce exothermic polymerizing reactions, then passing said products without substantial release of pressure or reduction in temperature through a reaction zone of relatively greater cross sectional area in which said products are maintained for a desired period of time, removing the products from said enlarged reaction zone and immediately chilling the products to a temperature below reaction temperature by direct contact with a cooling fluid before release of pressure, separating the condensed liquids from the lean gases, and stabilizing the condensed liquids by removing those components which are gases at ordinary temperatures and pressures.

2. The method of polymerizing unsaturated hydrocarbon permanent gases obtained from vapor phase cracking of hydrocarbon oils, which comprises passing such gases through an externally heated elongated reaction zone of restricted cross sectional area and therein heating said gases to a temperature between 800° F. and 1000° F. while under a pressure of 300 to 1000 pounds per square inch, then passing the heated products without substantial reduction in pressure through an externally unheated zone of materially greater cross sectional area than said first-named reaction zone, immediately cooling the products upon their discharge from the enlarged reaction zone to a fractionating temperature below reaction temperature by direct contact with a cooling fluid and while at said temperature and without substantial reduction in pressure separating condensed liquids from the remaining fixed gases, and then passing the condensed liquids under materially reduced pressure through a stabilizing zone to remove from the liquids those components which form gases at ordinary temperatures and pressures.

3. The method of polymerizing unsaturated hydrocarbon permanent gases obtained from vapor phase cracking of hydrocarbon oils, which comprises passing such gases through an externally heated elongated reaction zone of restricted cross sectional area and therein heating said gases to a temperature between 800° F. and 1000° F. while under a pressure of 300 to 1000 pounds per square inch, then passing the heated products without substantial reduction in pressure through an externally unheated zone of materially greater cross sectional area than said first-named reaction zone, immediately cooling the products upon their discharge from the enlarged reaction zone to a fractionating temperature below reaction temperature by direct contact with a cooling fluid and while at said temperature and without substantial reduction in pressure separating condensed liquids from the remaining fixed gases, then passing the condensed liquids under materially reduced pressure through a stabilizing zone to remove from the liquids those components which form gases at ordinary temperatures and pressures, and returning said last-named gases to said reaction zones.

4. The method of polymerizing unsaturated hydrocarbon permanent gases obtained from vapor phase cracking of hydrocarbon oils, which comprises passing such gases through an externally heated coil and therein heating said gases to a temperature between 800° F. and 1000° F. while under a pressure of 300 to 1000 pounds per square inch, then passing said heated products without substantial reduction in temperature and pressure from said coil through an enlarged reaction drum, then abruptly cooling the products of such reactions while under reaction pressure by direct contact with a cooling fluid, immediately upon their discharge from said drum, to a temperature not substantially in excess of 600° F. and fractionating said products to separate the desired liquid compounds from the remaining fixed gases.

5. The method of polymerizing hydrocarbon gases having a high olefinic content, which comprises heating such gases in a zone of restricted cross-sectional area to a temperature above 800° F., but below a temperature where substantial cracking takes place, while under a super-atmospheric pressure of the order of 300 to 1000 pounds per square inch, to produce exothermic polymerization reactions, passing the heated gas through a reaction zone wherein polymerization of the gases to liquid hydrocarbons takes place, then abruptly cooling the products of such reaction by direct contact with a cooling fluid immediately upon their discharge from said reaction zone, to a temperature not substantially in excess of 600° F. without substantial release of pressure, separating the condensed liquids from the uncondensed gases, and stabilizing the condensed liquid by removing therefrom those components which are gases at ordinary temperatures and pressures.

6. The method of polymerizing hydrocarbon gases having a high olefinic content, which comprises heating such gases in a zone of restricted cross-sectional area to a temperature above 800° F., but below a temperature where substantial cracking takes place, while under a super-atmospheric pressure of the order of 300 to 1000 pounds per square inch, to produce exothermic polymerization reactions, passing the heated gas through a reaction zone wherein polymerization of the gases to liquid hydrocarbons takes place, then abruptly cooling the products of such reaction by direct contact with a cooling fluid immediately upon their discharge from said reaction zone, to a temperature not substantially in excess of 600° F. without substantial release of pressure, separating the condensed liquids from the uncondened gases while under reaction pressure, reducing the pressure, and stabilizing the condensed liquid by removing therefrom those components which are gases at ordinary temperatures and pressures.

7. The method of polymerizing hydrocarbon gases having a high olefinic content, which comprises heating such gases in a zone of restricted cross-sectional area to a temperature above 800° F., but below a temperature where substantial cracking takes place, while under a super-atmospheric pressure of the order of 300 to 1000 pounds per square inch, to produce exothermic polymerization reactions, passing the heated gas through a reaction zone wherein polymerization of the gases to liquid hydrocarbons takes place, then abruptly cooling the products of such reaction by direct contact with a cooling fluid immediately upon their discharge from said reaction zone, to a temperature not substantially in excess of 600° F. without substantial release of pressure, separating the condensed liquids from the uncondensed gases while under reaction pressure, reducing the pressure, stabilizing the condensed liquid by removing therefrom those components which are gases at ordinary temperatures and pressures, and returning to the heating and reaction zones gases produced by such stabilization.

8. The method of polymerizing hydrocarbon gases having a high olefinic content, which comprises passing said gases through a heated zone of restricted cross-sectional area and heating the gases to a temperature in excess of 800° F., but below a temperature where substantial cracking takes place, while under a pressure of the order of 300 to 1000 pounds per square inch, to produce exothermic polymerization reactions, passing the heated gases through a reaction zone, cooling and condensing the products of such reaction without substantially releasing the pressure thereon, separating the condensed liquids from the uncondensed gases, stabilizing the condensed liquids by removing therefrom those components which are gases at ordinary temperatures and pressures, and recirculating a portion of the condensed liquid into direct and immediate contact with the products immediately discharged from the reaction zone before release of pressure, to abruptly reduce the temperature of such products to a temperature below reaction temperature.

9. The method of polymerizing hydrocarbon gases having a high olefinic content, which comprises passing said gases through a heated zone of restricted cross-sectional area and heating the gases to a temperature in excess of 800° F., but below a temperature where substantial cracking takes place, while under a pressure of from 300 to 1000 pounds per square inch, to produce exothermic polymerization reactions, passing the heated gases through a reaction zone, cooling and condensing the products of such reaction without substantially releasing the pressure thereon, separating the condensed liquids from the uncondensed gases before release of pressure, stabilizing the condensed liquids by removing therefrom those components which are gases at ordinary temperatures and pressures, and recirculating a portion of the condensed liquid into direct and immediate contact with the products immediately discharged from the reaction zone before release of pressure, to abruptly reduce the temperature of such products to a temperature not substantially in excess of 600° F.

10. In a process of polymerizing gases containing unsaturated hydrocarbons at high super-atmospheric pressure and in which the gases are heated in a restricted stream and then passed through an enlarged reaction zone, the steps which comprise contacting the products leaving the reaction zone with relatively cool liquid hydrocarbons while still under high super-atmospheric pressure, separating and withdrawing uncondensed gases, then lowering the pressure and separating normally gaseous hydrocarbons containing propylene and butylene from the liquid hydrocarbons, and returning said gaseous hydrocarbons containing propylene and butylene for admixture with the fresh gases to be processed.

11. Process in accordance with claim 10 in which the liquid hydrocarbon is condensate formed in the polymerization process.

12. In a process of polymerizing gases containing unsaturated hydrocarbons at high super-atmospheric pressure and in which the gases are heated in a restricted stream and then passed through an enlarged reaction zone, the steps which comprise contacting the products leaving the reaction zone while still under high super-atmospheric pressure with relatively cool liquid hydrocarbons, cooling the resulting mixture to a temperature sufficient to condense propylene and butylene fractions, withdrawing uncondensed gases from the system, separating the propylene and butylene fractions from the normally liquid hydrocarbons, and returning the propylene and butylene fractions for admixture with the fresh gases to be processed.

13. In a process of polymerizing gases containing unsaturated hydrocarbons at high super-atmospheric pressure and in which the gases are heated in a restricted stream and passed through a reaction zone, the steps which comprise contacting the products leaving the reaction zone with relatively cool liquid hydrocarbons while still under high super-atmospheric pressure, separating and withdrawing uncondensed gases from the system, then lowering the pressure and separating normally gaseous hydrocarbons of higher molecular weight such as propylene and butylene from the liquid hydrocarbons, and returning said last mentioned gaseous hydrocarbons for admixture with the fresh gases to be treated.

14. In a process of polymerizing gases containing unsaturated hydrocarbons at high super-atmospheric pressure and in which the gases are heated in a restricted stream and passed through a reaction zone, the steps which comprise contacting the products leaving the reaction zone with relatively cool liquid hydrocarbons while still under high super-atmospheric pressure, cooling the resulting mixture to a temperature sufficient to condense higher molecular weight hydrocarbon gases such as propylene and butylene, separating and withdrawing uncondensed gases from the system, then lowering the pressure and separating normally gaseous hydrocarbons of higher molecular weight such as propylene and butylene from the liquid hydrocarbons, and returning said last mentioned gaseous hydrocarbons for admixture with the fresh gases to be treated.

CARY R. WAGNER.